US006006603A

United States Patent [19]

Molnar et al.

[11] Patent Number: 6,006,603

[45] Date of Patent: Dec. 28, 1999

[54] COMPRESSED AIR MAINTENANCE DEVICE

[75] Inventors: György Molnar; Ludwig Küther, both of Waldenbuch; Christoph Schultz, Lüdenscheid; Ulrike Tetek, Reutlingen, all of Germany

[73] Assignee: J. Lorch Ges. & Co. KG Gesellschaft fur Maschinen und Einrichtungen, Germany

[21] Appl. No.: 08/930,413

[22] PCT Filed: May 11, 1996

[86] PCT No.: PCT/EP96/02025

§ 371 Date: Sep. 29, 1997

§ 102(e) Date: Sep. 29, 1997

[87] PCT Pub. No.: WO96/38671

PCT Pub. Date: Dec. 5, 1996

[30] Foreign Application Priority Data

Jun. 1, 1995 [DE] Germany ....................... 295 09 073 U

[51] Int. Cl.$^{6}$ ............................. G01L 19/08; F15B 19/00

[52] U.S. Cl. ................................................. 73/168; 73/714

[58] Field of Search ............................ 73/168, 714, 756; 346/451, 525; 137/551, 557

[56] References Cited

U.S. PATENT DOCUMENTS

| | | | |
|---|---|---|---|
| 4,727,353 | 2/1988 | Ruhter | 340/525 X |
| 5,197,330 | 3/1993 | Onodera | 73/431 |

*Primary Examiner*—Hezron Williams
*Assistant Examiner*—Willie Morris Worth
*Attorney, Agent, or Firm*—Dick and Harris

[57] ABSTRACT

Besides the individual modules (1', 1'''), a compressed air maintenance device consisting of individual easily interchangeable modules (1), e.g. pressure regulators, oil atomisers (1'''), condensate separators (1'), in which the individual modules (1) may have emitters (8) for the actual operating status and/or predetermined limit values, also has an indicating and monitoring module (1'') having optical and/or acoustic signalling devices (10) for the operational and/or fault status determined for the individual modules (1). Said signalling devices (10) can be easily coupled to the relevant emitters (8) of the modules (1). Any necessary maintenance work or operational breakdowns are thus easily recognizable.

14 Claims, 4 Drawing Sheets

COMPRESSED AIR MAINTENANCE DEVICE

BACKGROUND OF THE INVENTION

The invention relates to a compressed air maintenance device consisting of individual easily interchangeable modules, such as pressure regulators, oil atomizers, and condensate separators, whereby the individual modules may include transmitters for current operating status and/or predetermined limit values.

This type of compressed air maintenance device has been described in DE 40 32 515 A1. Because of the varying placement of transmitter, it is difficult to monitor the operating status of individual modules. Consequently, operational breakdowns or required maintenance work are not easily detected, leading to the risk of necessary maintenance work not being completed. Because of the varying shapes of the individual modules, the overall appearance of this type of maintenance device is not particularly pleasant. Some countries require that openly arranged viewing windows be covered so as to prevent an environmental hazard in the event of damage to the device. In such cases, additional covers or casing components are required.

To eliminate the aforementioned disadvantages, the object of the invention is to modify the type of compressed air maintenance device described earlier in such a way as to ensure that necessary maintenance work or operational breakdowns can be easily recognized.

SUMMARY OF THE INVENTION

To address this object, the invention includes, in addition to the other modules, an indicating and monitoring module. According to the invention, this module includes optical and/or acoustic indicators to indicate the operating or fault status of individual modules. These indicators are easily coupled to the relevant transmitters in the modules. It is particularly important to include an indicator for operating pressure and indicators for fill level limit values of the relevant modules.

The concentration of all operationally relevant indicators in a single module provides for a significantly better overview and more straightforward monitoring. The use of a single tap connected to the indicating and monitoring module reduces the cost and complexity of electronic connections to control devices, other indicators, etc.

A visually consistent appearance with particularly straightforward placement of the indicators can be achieved by using hollow individual modules with undercut longitudinal grooves, which allows for easy interchangeability of adjacent modules. This type of arrangement allows for optimal matching of adjacent modules, thus providing an optimal industrial design.

U-shaped clamps which fit into an adjacent module's grooves are intended to provide easy interchangeability between adjacent modules. Because of this feature, individual modules can be replaced easily and without the need for a special tool.

Advantageously, each hollow section has at least four longitudinal grooves, so that two adjacent modules can be connected in a way that eliminates the need for any additional measures to seal connections between segments.

To allow for its use in various applications, the indicating and monitoring module may include an interchangeable modular component containing at least one circuit board for the indicators' electronics, while the circuit board itself may include plug-in terminals for lines connected to the modules' transmitters. Depending on the requirements of a given application, appropriate modular components may be selected and installed in the indicating and monitoring module. Because parts are readily interchangeable, maintenance and particularly repairs can be accomplished quickly and at a very low cost, even during operation of the device.

Advantageously, the modular component is designed to fit into the hollow section along its axis. In addition, there may be an opening in the bottom of the modular component to allow for the insertion of transfer lines from the modules' transmitters, which can be connected to the plug-in terminals.

Relatively little incremental design effort is required to include a view plate, which can be located in front of the hollow section and on which the transmitters' optical displays are arranged in a clearly visible manner.

To allow for trouble-free replacement of the modular component during operation, the modular component may include an air adapter, through which the indicating and monitoring module's pressure sensors are connected to the air tube that runs through all modules. This air adapter closes automatically when the modular component is removed. To this end, the air adapter may include a hollow tappet which holds a valve unit in the air adapter in its "open position".

To allow for the use of the greatest possible number of identical parts with the various modules, each module includes a headpiece that forms the upper edge of the hollow section and through which an air tube is fed. Furthermore, each module containing a hollow section includes a base piece at the lower edge of the hollow section; transfer lines connecting the transmitters and indicators are installed in the base piece, possibly behind an additional casing element. As the headpieces and base pieces already contain the modules' primary operational elements, these elements are pre-installed and are simply placed onto the hollow section during final assembly. Each headpiece and base piece seal off the hollow section to which they are attached, thus eliminating the need to apply any additional sealing measures to the individual components.

At a relatively low incremental production cost, a slit-shaped opening sealed by a view window may be included in the hollow section. This feature would allow for ready monitoring of the oil fill level in an oil atomizer or in a condensate separator.

Other features specific to the invention are described in the sub-claims. These features, along with their advantages, are discussed in the following text, using the enclosed drawings for reference.

BEST MODE FOR CARRYING-OUT THE INVENTION

Figure 1:
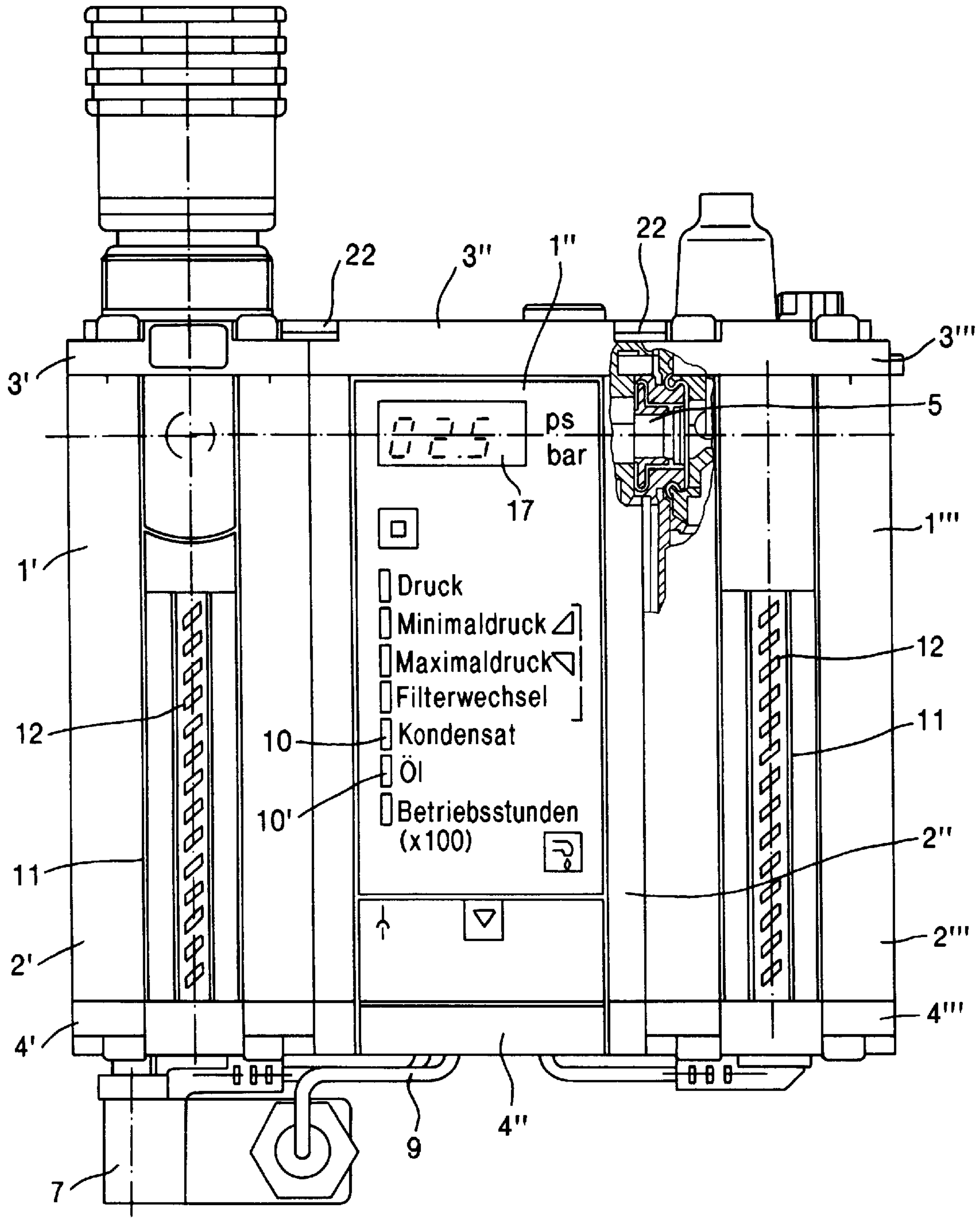
FIG. 1: A frontal view of a compressed air maintenance device
Figure 2:
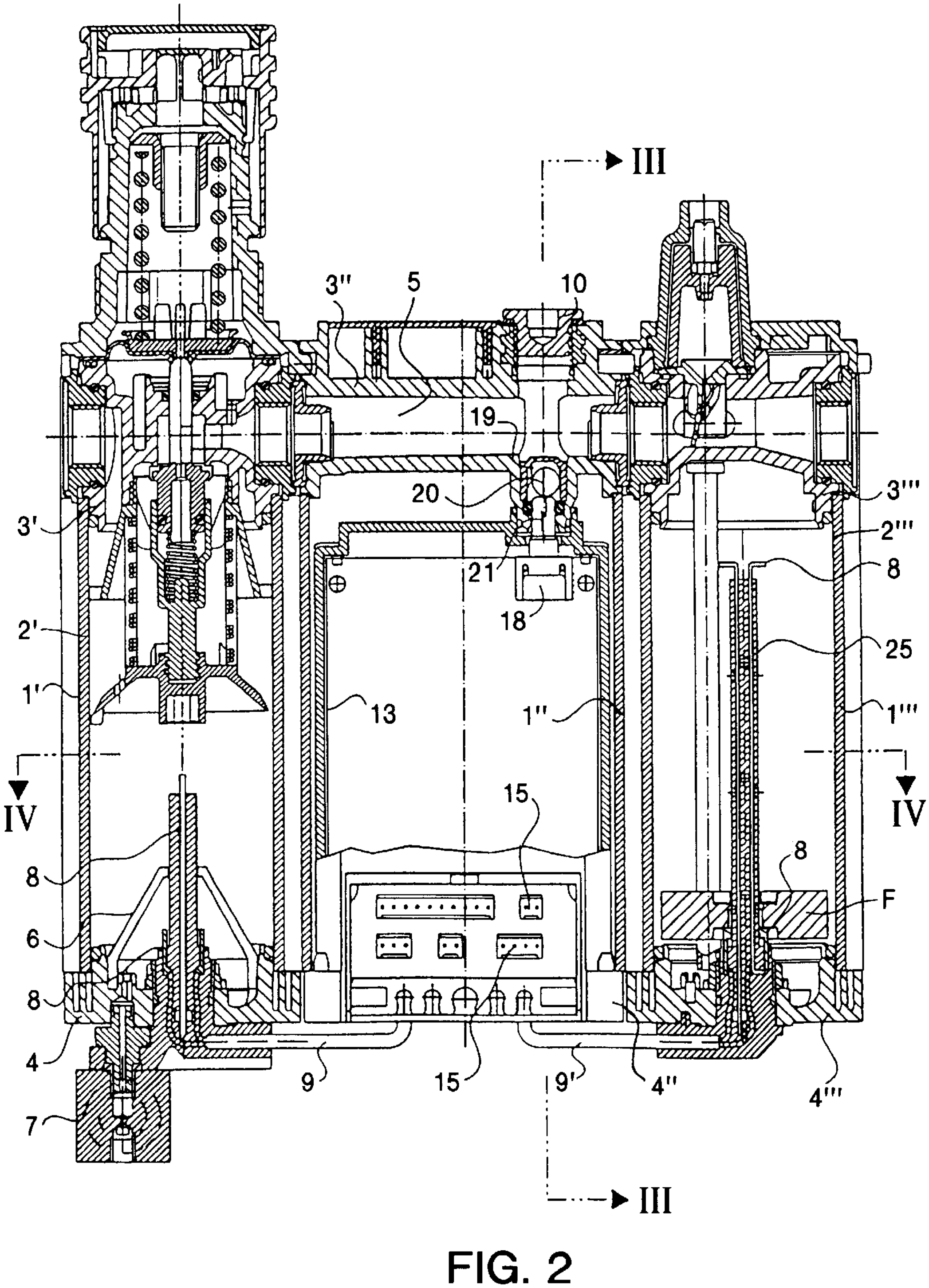
FIG. 2: A cross-section of the maintenance device depicted in FIG. 1

The example of a compressed air maintenance device presented here includes three modules (1), i.e., a condensate separator (1'), an indicating and monitoring module (1"), and an oil atomizer (1'").

Each module (1) includes an extruded hollow section (2, 2''', 2'''), preferably made of aluminum, which is sealed at the top by a headpiece (3, 3', 3''') and at the bottom by a base piece (4', 4'', 4''').

An air tube (5) is fed through the headpieces (3', 3'', 3'''). Using known methods, condensate is separated in the condensate separator (1') from the air passing through the air tube (5) and accumulates at the bottom of the hollow section (1'). Using a protective filter (6), the accumulated condensate can be removed through a drainage valve (7).

Two transmitters (8) are installed in a fill level sensor located in the base piece (4') of the condensate separator (1'). When the level of condensate reaches the upper unattached end of the fill level sensor, a signal is transmitted to a indicator (10) via a transfer line (9).

In addition, a window (12) may be included in an opening (11) in the hollow section (2') to facilitate monitoring of condensate levels. With the exception of the fact that its primary components are installed in the headpiece (3') and/or base piece (4'), the structure of the condensate separator is known. Consequently, a more detailed description of its operation does not appear to be necessary.

The same applies to the oil atomizer (1''). Two transmitters (8) located in the atomizer's base piece (4'') are used to determine fill levels. Thus, oil level limits can, using known and straightforward technology, be displayed on the indicating and monitoring module's (1'') indicator (10') via a transfer line (9').

Figure 3:
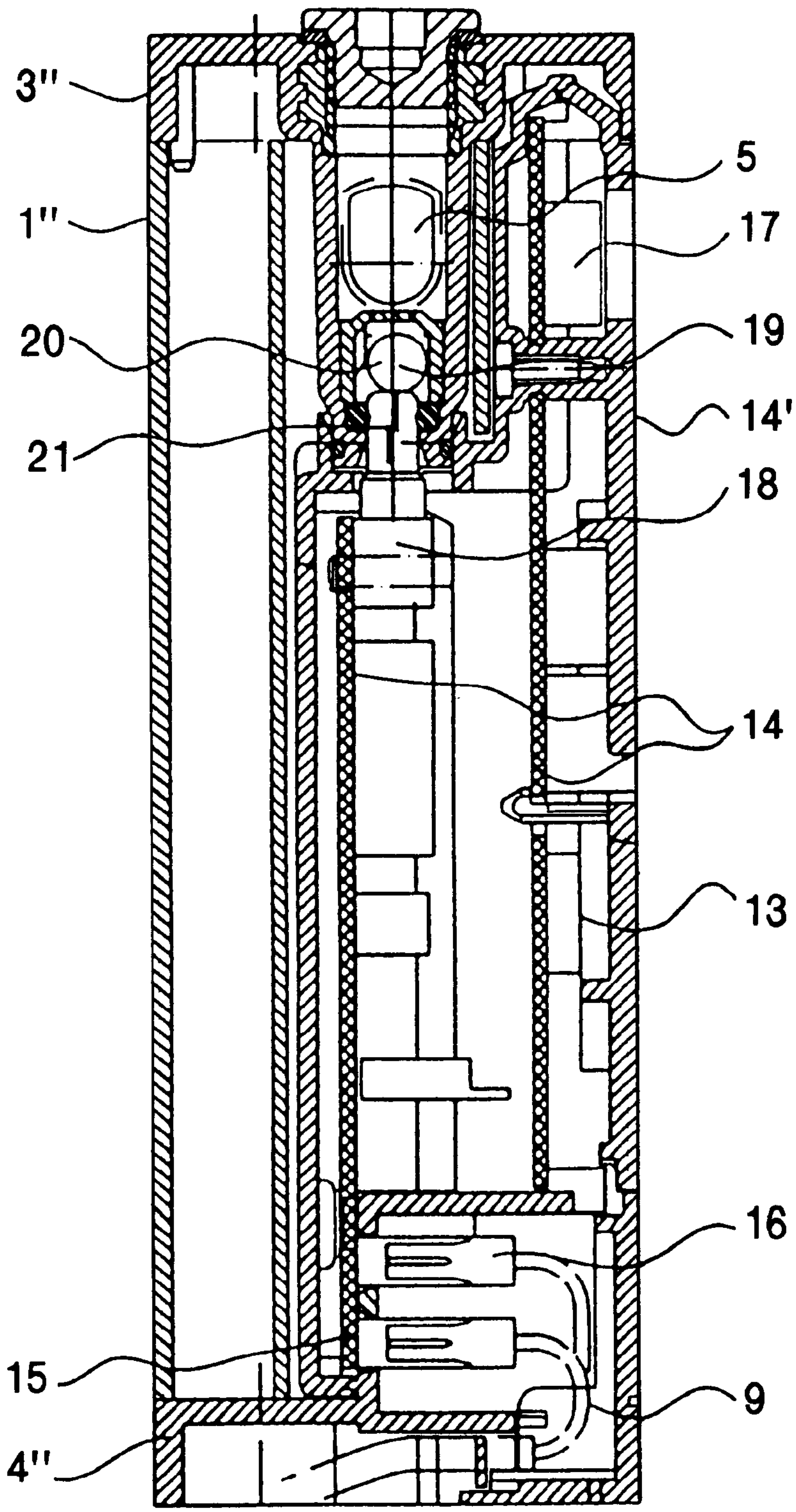
FIG. 3: A cross-section through an indicating and monitoring module, based on line III—III in FIG. 2

The indicating and monitoring module (1'') includes a modular component (13) that can be inserted from below into the hollow section (1''). As indicated in FIG. 3, this modular component contains the display electronics, particularly one or more boards (14) containing the requisite electronic components. At least one of the boards (14) has plug-in terminals (15) for plugs (16) connected to the transfer lines (9, 9'). As evident in FIGS. 1 and 3, one of the boards (14) may consist of a visible board (14') into which the optical display elements are inserted. An example of such a display element is a digital pressure indicator (17) showing current operating pressure.

Advantageously, the modular insert (3) may contain a pressure sensor (18) used to monitor operating pressure in the air tube (5).

To allow for replacement of the modular insert (13) during operation, the head piece (3'') is designed to contain an air adapter (19). This air adapter contains a valve unit (20), which is held in its open position by a hollow tappet (21) section of the modular insert component (13), thus connecting the tube (5) with the pressure sensor (18).

Figure 4:
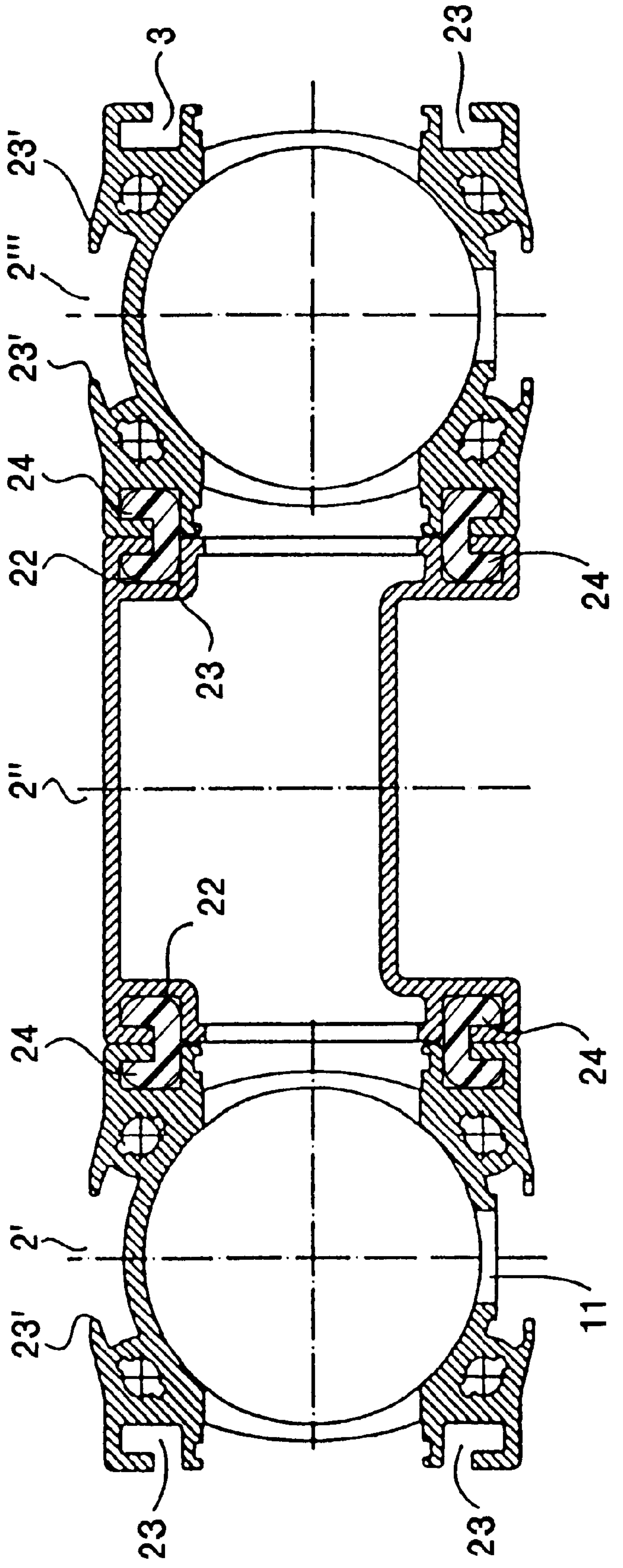
FIG. 4: Another cross-section through an indicating and monitoring module, based on line IV—IV in FIG. 2, excluding the modular inserts

As is particular evident in FIG. 4, the individual modules are connected to one another with clamps (22). To this end, the hollow sections (2) have undercut longitudinal grooves (23). Each hollow section (2', 2'', 2''') is equipped with at least four of these longitudinal grooves (23). The grooves have an L-shaped profile, while the limbs of the U-shaped clamps (22) have a matching U-shaped profile.

For purpose of production process rationalization, the shapes of the hollow sections (2', 2'') of the condensate separator (1') and of the oil atomizer (1''') are identical. These hollow sections (2', 2'') have additional longitudinal grooves (23'). These additional grooves may be used, for example, in mounting the compressed air maintenance device onto a wall or secure signs or maintenance instructions, etc.

By concentrating the indicators (10) in the indicating and monitoring module (1'), device operation can be monitored virtually at a glance, thus optimizing device maintenance and operation. The entire monitoring system can be linked to the local computer system via a single connection, so that monitoring and control functions can be exercised from virtually any location.

We claim:

1. A compressed air monitoring device consisting of easily interchangeable individual functional modules (1', 1'''), wherein each individual module (1', 1''') includes at least one transmitter (8) for at least one of current operational status and predetermined limit values, characterized in that the compressed air monitoring device includes an indicating and monitoring module (1'') in addition to the individual modules (1', 1'''), that this indicating and monitoring module (1'') contains indicators (10) which transmit information on the at least one of the status and limit values of the individual modules (1', 1'''), and that the indicators (10, 10') are easily connected to the corresponding transmitter (8) on the individual modules (1', 1'''), the indicating and monitoring module (1'') further containing common electric circuitry connecting the indicators (10) to the transmitters (8) from at least two individual modules (1', 1''').

2. A compressed air monitoring device according to claim 1, characterized in that the individual modules (1) include hollow sections with undercut longitudinal grooves (23), which can be used to connect easily interchangeable adjacent modules (1).

3. A compressed air monitoring device according to claim 2, characterized in that the ready interchangeability between adjacent modules is achieved with U-shaped clamps (22) whose limbs fit into longitudinal grooves (23) in the adjacent modules (1).

4. A compressed air monitoring device according to claim 2, characterized in that each hollow section (2) has at least four longitudinal grooves (23, 23').

5. A compressed air monitoring device according to claim 4, characterized in that there are two spaced longitudinal grooves (23) the side of each adjacent module (1).

6. A compressed air monitoring device according to claim 3, characterized in that the longitudinal grooves (23) have an L-shaped profile and the limbs (24) have a U-shaped profile to match the clamps (22) (FIG. 4).

7. A compressed air monitoring device according to claim 1, characterized in that the signaling and monitoring module (1'') includes an interchangeable modular component (13), which contains at least one board (14) for the electronics of the indicators (10), with the board (14) including plug-in terminals (15) for transfer lines (9, 9') to the transmitters (8) of the modules.

8. A compressed air monitoring device according to claim 7, characterized in that the modular component (13) can be inserted in the hollow section (2'') along its axis and, furthermore, that there is an opening in the bottom of the modular component (13) to allow for the insertion of plugs (16) connected to transfer lines (9, 9') from the transmitters (8) of the modules (1', 1'''), which can be connected to the plug-in terminals (15).

9. A compressed air monitoring device according to claim 7, characterized in that the modular component (13) includes a view plate (14'), located in front of the hollow section (2''), on which the optical displays of the indicators (8) are arranged in a visible manner.

10. A compressed air monitoring device consisting of easily interchangeable individual functional modules (1', 1''') wherein each individual module (1', 1''') includes at least one transmitter (8) for at least one of current operational status and predetermined limit values, characterized in that the compressed air monitoring device includes an indicating and monitoring module (1") in addition to the individual modules (1', 1'"), that this indicating and monitoring module (1") contains indicators (10) which transmit information on the at least one of the status and limit values of the individual modules (1', 1'"), and that the indicators (10, 10') are easily connected to the corresponding transmitters (8) on the individual modules (1', 1'"), the indicating and monitoring module (1") further containing common electric circuitry connecting the indicators (10) to the transmitters (8) from at least two individual modules (1', 1'"), the signaling and monitoring module (1") including an interchangeable modular component (13), which contains at least one board (14) for the electronics of the indicators (10), with the board (14) including plug-in terminals (15) for transfer lines (9, 9') to the transmitters (8) of the individual modules (1', 1'");

the compressed air monitoring device being further characterized in that the modular component (13) includes an air adapter (19), through which pressure sensors (18) in the indicating and monitoring module (1") are connected to an air tube (5) that runs through all modules (1), whereby the air adapter (19) closes automatically when the modular component (13) is removed from the indicating and monitoring module (1").

11. A compressed air monitoring device according to claim 10, characterized in that the air adapter (19) includes a hollow tappet (21), which is connected to the modular component (13) and with which an air adapter (19) valve unit (20) is held in its "open position".

12. A compressed air monitoring device consisting of easily interchangeable individual functional modules (1', 1'") wherein each individual functional module (1', 1'") includes at least one transmitter (8) for at least one of current operational status and predetermined limit values, characterized in that the compressed air monitoring device includes an indicating and monitoring module (1") in addition to the individual modules (1', 1'"), that this indicating and monitoring module (1") contains indicators (10) which transmit information on the at least one of the status and limit values of the individual modules (1', 1'"), and that the indicators (10, 10') are easily connected to the corresponding transmitters (8) on the individual modules (1', 1'"), the indicating and monitoring module (1") further containing common electric circuitry connecting the indicators (10) to the transmitters (8) from at least two individual modules (1', 1'"), the individual modules (1', 1'") including hollow sections with undercut longitudinal grooves (23), which can be used to connect easily interchangeable adjacent modules (1), the compressed air monitoring device further characterized in that each module (1), that includes a corresponding hollow section (2), also includes a headpiece (3), which forms the upper edge of the hollow section (2), and that an air tube (5) is fed through this headpiece (3), and that, furthermore, each module (1) that includes a hollow section (2) also includes a base piece (4), which forms the lower edge of the hollow section (2), and that transfer lines (9) connecting the transmitters (8) and indicators (10) are installed in the base piece (4).

13. A compressed air monitoring device according to claim 12, characterized in that each headpiece (3) and base piece (4) pair tightly seals the corresponding hollow section (2), and that the hollow section (2), in direct combination with the headpiece (3) and the base piece (4), comprises the module (1) for one of a pressure regulator, condensate separator (1'), oil atomizer (1'").

14. A compressed air monitoring device according to one of claims 1 through 13, characterized in that there is at least one slit-shaped opening (11), covered by a sealed window (12), in the hollow section (2).

* * * * *